United States Patent [19]

Goodell

[11] Patent Number: 4,596,265

[45] Date of Patent: Jun. 24, 1986

[54] QUICK RELEASE VALVE

[75] Inventor: David J. Goodell, Lorain, Ohio

[73] Assignee: Allied Corporation, Morristown, N.J.

[21] Appl. No.: 671,719

[22] Filed: Nov. 15, 1984

[51] Int. Cl.⁴ ............................................. F16K 7/17
[52] U.S. Cl. .................................... 137/102; 137/843;
303/69
[58] Field of Search ............... 137/102, 107, 843, 852,
137/854; 303/69

[56] References Cited

U.S. PATENT DOCUMENTS

| | | | |
|---|---|---|---|
| 1,506,012 | 8/1924 | Lewis | 137/843 |
| 3,424,185 | 1/1969 | Lansky | 137/102 |
| 3,633,613 | 1/1972 | Julow | 137/854 X |
| 4,004,603 | 1/1977 | Jones | 137/107 |
| 4,119,351 | 10/1978 | Durling | 303/69 X |
| 4,204,555 | 5/1980 | Durling | 137/102 |
| 4,453,780 | 6/1984 | Neal | 137/102 X |
| 4,461,313 | 7/1984 | Beaumont | 137/102 |

Primary Examiner—Robert G. Nilson
Attorney, Agent, or Firm—Ken C. Decker; William N. Antonis

[57] ABSTRACT

A quick release valve for a vehicle fluid pressure braking system includes a housing having inlet, exhaust and delivery ports. A bead circumscribes the inlet port to provide a valve seating area for a flexible diaphragm within the valve housing, and the exhaust port includes a projecting portion which preloads the flexible diaphragm into engagement with the bead circumscribing the inlet port. Accordingly, pressure variations between the ports cannot force the flexible diaphragm to vibrate to create an undesirable honking noise. Furthermore, the circumferentially extending bead assures a pressure-tight seal with the flexible diaphragm, and also establishes a predetermined sealing area for the diaphragm, thereby reducing valve hysteresis by preventing sealing of the diaphragm at varying areas on the housing.

7 Claims, 4 Drawing Figures

QUICK RELEASE VALVE

This invention relates to a quick release valve for a vehicle air brake system.

Quick release valves have been used to exhaust braking pressure to atmosphere, and normally include a flexible diaphragm mounted within a housing having an inlet port connecting with the vehicle operator-actuated control valve, and delivery ports connected to the brake actuators. When the brakes of the vehicle are released, the pressure level at the inlet or supply port is reduced, thereby causing the delivery ports to be communicated to atmosphere through an exhaust port. However, the flexible diaphragm used in prior art quick release valves sometimes generated a very undesirable loud "honking" noise when low pressure levels were present in any of the ports. It is the primary advantage of the present invention that this undesirable honking noise is eliminated.

The undesirable honking noise generated by prior art quick release valves appears to have been generated by vibration of the flexible diaphragm used in these valves against the exhaust valve seat. These vibrations, similar to the vibrations of the diaphragm in an air horn when the air horn is sounded, generated the undesirable noise. The present invention provides a projecting portion on the exhaust port, to provide a prestress or preload at the center portion of the flexible diaphragm, thereby yieldably biasing the peripheral portion into engagement with the valve seating area circumscribing the inlet port. Since the center of the flexible diaphragm is stressed, the diaphragm cannot vibrate in response to pressure variations between the ports at low pressure levels. Furthermore, the projecting portion holds the flexible diaphragm off the exhaust valve seating area, so that any vibrations that would occur cause the flexible diaphragm to balance on the valve seat.

These and other advantages of the invention will become apparent from the following specification, with reference to the accompanying drawings, in which.

Figure 1:
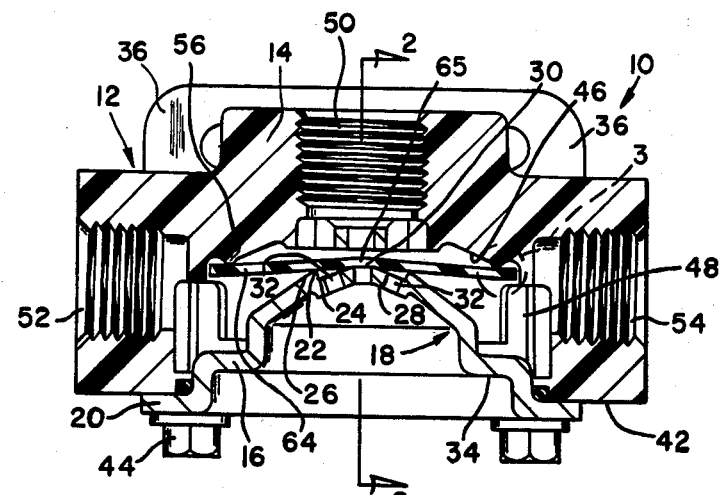
FIG. 1 is a cross-sectional view of a valve made pursuant to the teachings of my present invention.
Figure 2:
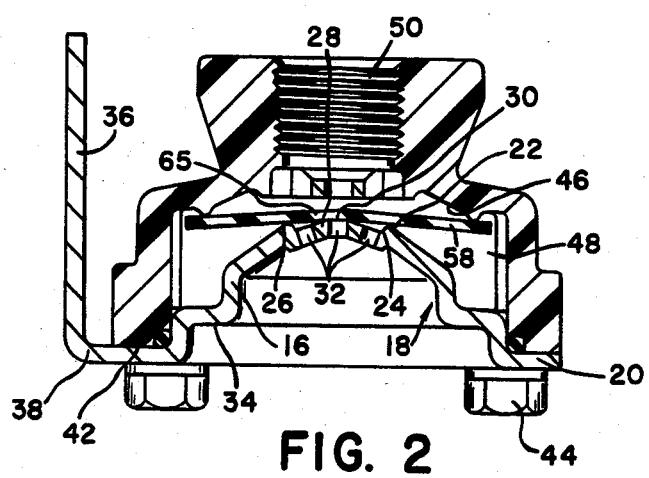
FIG. 2 is a cross-sectional view taken substantially along lines 2—2 of FIG. 1.
Figure 3:
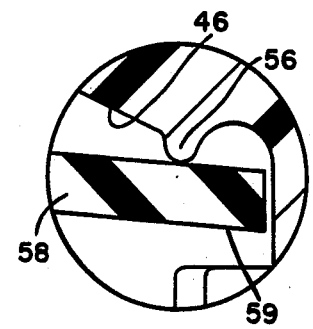
FIG. 3 is an enlarged detail view of the circumscribed portion of FIG. 1.

Referring now to the drawings, a quick release valve generally indicated by the numeral 10 includes a housing 12 comprising an upper body portion 14, which is preferably made from a nonmetallic molded material, and a lower body portion or support member 16, which is preferably made from metal. The lower body or support portion 16 comprises a stepped cylindrical portion generally indicated by the numeral 18 which terminates in a circumferentially extending tab 20. The upper portion (viewing the drawings) of the cylindrical portion 18 carries a circumferentially extending valve bead 22 having an inner edge 24 and an outer edge 26. A convex, dome-shaped portion of the cylindrical section 18 is indicated as at 28. The outer circumference of the dome-shaped section 28 joins the bead 22 at the inner edge 24 thereof and the apex 30 of the domed portion 28 projects above (viewing the figure) the level or plane defined by the uppermost portion of the bead 22. Apertures 32 extend through the domed portion 28 to define an exhaust port, as will hereinafter be explained. The cylindrical portion 18 further includes a stepped section which defines a circumferentially extending shoulder 34. A mounting bracket 36 extends substantially perpendicularly from one edge 38 of the support 16. The bracket 36 is used to mount the valve 10 in an appropriate place on the vehicle (not shown).

Upper body portion 14 includes a peripheral edge 42 which is secured to the tab 20 by bolts 44. The upper body portion 14 defines a dome-shaped cavity 46 which receives the cylindrical portion 18 of the support portion 16. Accordingly, the cylindrical portion 18 and the cavity 46 cooperate to define a chamber 48 therebetween. A supply or inlet port 50 communicates with the chamber 48, as does outlet or delivery ports 52, 54 and the apertures 32 defining the exhaust port. An inlet valve seating area is defined by a circumferentially extending bead 56 on the wall of the cavity 46 and which circumscribes the inlet or supply port 50. Although the bead 56 is substantially concentric with the bead 22, the diameter of the bead 56 is substantially larger than is the diameter of the bead 22. A flexible diaphragm 58 is installed in the chamber 48 between the beads 22 and 56.

Although the diaphragm 58 is guided by the walls of the housing 12, the flexible diaphragm is otherwise free of restraint and is capable of moving between positions where it wraps around the bead 56 to a position where it wraps around the bead 22 as will hereinafter be described. The thickness and hardness of the flexible diaphragm 58 and the thickness of the beads 56 must be chosen carefully. The diaphragm 58 must be hard enough and thick enough to structurally withstand the pressure differentials involved between the ports during normal operation of the device, but must be thin enough and soft enough so that it can easily flex between positions in which it wraps around the bead 56 to a position where it wraps around the bead 22. The beads must be sharp enough and the diaphragm must be soft enough so that the diaphragm may be readily penetrated by the beads to provide a good seal. The beads 56 and 22 must be sharp enough to penetrate the flexible diaphragm 58 with high unit loading in order to effect a proper seal, but must not be so thin as to cut the material of the diaphragm 58. The diaphragm 58 includes an outer peripheral portion 59 that is free of support by the housing and this is able to wrap around the bead 56 to effect sealing. As will be explained in more detail hereinafter, the height of the apex 30 is chosen so that the diaphragm 58 is loaded against the bead 56 with sufficient force to prevent the diaphragm 58 from bouncing into and out of engagement with the bead 22 during low pressure levels in the chamber 48.

Figure 4:
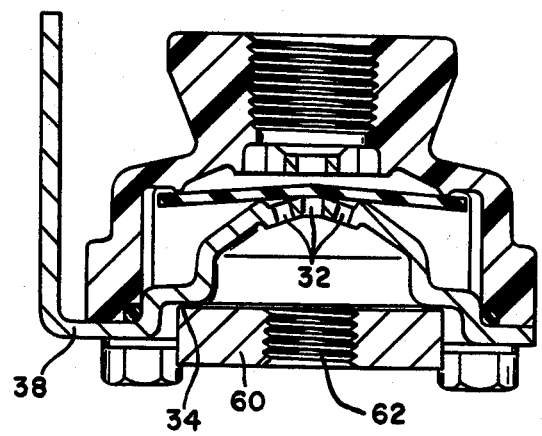
FIG. 4 is a view similar to FIG. 1 of an alternate embodiment of my invention.

Referring to the alternate embodiment of FIG. 4, a boss 60 may be secured by, for example, welding, to the shoulder 34 to provide a threaded opening 62 to which a hose (not shown) may be attached if it is necessary or desirable to communicate the air pressure vented to the aperture 32 defining the exhaust port to a location remote from the quick release valve 10. If desirable, a coil spring and diaphragm follower can be interposed between the upper surface of the shoulder 34 and the flexible diaphragm 58 to resiliently urge the latter into sealing engagement with the bead 56, so that the valve 10 will remain closed until a predetermined pressure differential between the inlet or supply port 50 and the delivery ports 52, 54 is attained.

In operation, the various components of the valve 10 are illustrated in the drawings of the positions which they assume when all of the ports are at atmospheric pressure or when only a very small pressure level is present in the inlet and delivery ports. In this condition, the projecting portion 28 prestresses the center portion 65 of the diaphragm 58 to bias the peripheral portion 64 thereof, which circumscribes the central portion 65, into sealing engagement with the bead 56. The projecting portion 28 is above the plane defined by the upper edge of the bead 22 a distance sufficient to form a small preload on the diaphragm 58, thereby preventing the latter from engaging the bead 22. Accordingly, slight vibrations of the flexible diaphragm 58, caused by small variations in the pressure in the ports 50, 52 and 54, will not cause the flexible diaphragm 58 to vibrate because of the preload exerted by the projecting portion 28. In prior art devices wherein the flexible diaphragm rested directly on the valve seating area, vibrations induced in the diaphragm due to variations in the pressure levels at the various ports caused the flexible diaphragm to vibrate, thereby producing an undesirable loud "honking" noise. Due to the prestress applied to the flexible diaphragm 58 by the projecting portion 28, the vibration of the diaphragm 58 is inhibited, and since the diaphragm 58 is held away from the valve seating area provided by the bead 22, it is not possible for the flexible diaphragm to vibrate on the bead.

When the pressure level at the inlet or supply port 50 increases above the pressure at delivery ports 52, 54 by a sufficient amount, the peripheral portion 64 of the flexible diaphragm 58 is deflected away from the bead 56, and the flexible diaphragm is urged into sealing engagement with the bead 22, to thereby close off the exhaust port defined by the apertures 32. Accordingly, substantially uninhibited communication is then permitted between the supply or inlet port 50 and the delivery ports 52, 54. Upon release of the pressure at the supply or inlet port 50, the higher pressure level at the delivery ports 52, 54 urge the flexible diaphragm back into sealing engagement with the bead 56. The bead 56 provides a predetermined sealing diameter for the flexible diaphragm 58. Prior art devices, without the bead 56, enabled the flexible diaphragm 58 to seal almost anywhere along the upper surface of the cavity 46, so that the area exposed to the pressure levels at the various ports varied depending upon the point at which the seal occurred. Accordingly, since sealing of the diaphragm against the bead 56 always occurs at the same diameter, the area of the diaphragm exposed to the pressure level at the various ports remains almost constant, thereby substantially reducing hysteresis, since the same area is involved, the same pressure level will always cause the flexible diaphragm to engage or disengage the bead 56. Furthermore, the bead 56 is able to penetrate the flexible seal 58, and the peripheral portion 64 of the flexible diaphragm 58 is able to wrap around the bead to assure an effective seal. Similarly, the flexible diaphragm 58 is also able to wrap around the projecting portion 28 to engage the seal bead 22.

I claim:

1. Quick release valve assembly comprising a housing defining a chamber therewithin, an inlet port and an exhaust port in said housing and communicating with said chamber on substantially opposite sides thereof, a delivery port communicated with said chamber between the inlet and outlet ports, a flexible diaphragm positioned in said chamber between the inlet and outlet ports and adapted to control communication through the inlet and exhaust ports in response to changes in the pressure differentials between the inlet, delivery and exhaust ports, inlet and exhaust annular valve seating areas circumscribing said inlet and exhaust ports respectively, said housing including a projecting portion circumscribed by the exhaust valve seating area and projecting through the plane defined by said exhaust valve seating area, said projecting portion engaging said flexible diaphragm to exert a preload force on the latter urging it toward the inlet valve seating area, but permitting the flexible diaphragm to wrap around said projecting portion to engage the exhaust valve seating area to close communication through the exhaust port.

2. Quick release valve assembly as claimed in claim 1, wherein said inlet valve seating area circumscribes a center portion of said flexible diaphragm and said projecting portion of the housing engages said center portion of the flexible diaphragm.

3. Quick release valve assembly as claimed in claim 2, wherein said exhaust port comprises one or more apertures in said projecting portion.

4. Quick release valve assembly as claimed in claim 3, wherein said inlet and exhaust annular valve seating areas are substantially concentric beads, the diameter of said inlet valve seating area being greater than the diameter of said exhaust valve seating area.

5. Quick release valve assembly comprising a housing defining a chamber therewithin, an inlet port and an exhaust port in said housing and communicating with said chamber on substantially opposite sides thereof, a delivery port communicated with said chamber between the inlet and outlet ports, a flexible diaphragm positioned in said chamber between the inlet and outlet ports and adapted to control communication through the inlet and exhaust ports in response to changes in the pressure differentials between the inlet, delivery and exhaust ports, inlet and exhaust annular valve seating areas circumscribing said inlet and exhaust ports respectively, said housing including a projecting portion circumscribed by the exhaust valve seating area engaging said flexible diaphragm to exert a preload force on the latter urging it toward the inlet valve seating area, but permitting the flexible diaphragm to wrap around said projecting portion to engage the exhaust valve seating area to close communication through the exhaust port, said inlet valve seating area circumscribing a center portion of said flexible diaphragm and said projecting portion of the housing engaging said center portion of the flexible diaphragm, said exhaust port comprising one or more apertures in said projecting portion, said exhaust valve seating area being a circumferentially extending bead on said housing having inner and outer edges, said projecting portion being a convex dome-shaped portion of said housing having its base at the inner edge of the bead defining the exhaust valve seating area, the center of said dome-shaped portion projecting above the level of the top of the bead defining the exhaust valve seating area.

6. Quick release valve means as claimed in claim 5, wherein said flexible diaphragm has a peripheral portion circumscribing a center portion, said peripheral portion engaging the inlet valve seating area and said center portion being stressed by the engagement of the projecting portion.

7. Quick release valve assembly comprising a housing defining a chamber therewithin, an inlet port and an exhaust port in said housing and communicating with said chamber on substantially opposite sides thereof, a delivery port communicated with said chamber between the inlet and outlet ports, a flexible diaphragm positioned in said chamber between the inlet and outlet ports and adapted to control communication through the inlet and exhaust ports in response to changes in the pressure differentials between the inlet, delivery and exhaust ports, inlet and exhaust annular valve seating areas circumscribing said inlet and exhaust ports respectively, said housing including a portion circumscribed by the exhaust valve seating area, said exhaust valve seating area defining a plane, said circumscribed portion of the housing projecting from below the plane defined by said exhaust valve seating area to a level above the plane defined by said exhaust valve seating area to define a projecting portion engaging said flexible diaphragm to exert a preload force on the latter urging it toward the inlet valve seating area, but permitting the flexible diaphragm to wrap around said projecting portion to engage the exhaust valve seating area to close communication through the exhaust port.

* * * * *